(12) United States Patent
Teng

(10) Patent No.: US 6,870,108 B1
(45) Date of Patent: Mar. 22, 2005

(54) CABLE FIXER FOR AN ELECTRONIC DEVICE

(75) Inventor: Wei-Chih Teng, Taipei Hsien (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/761,341

(22) Filed: Jan. 22, 2004

(30) Foreign Application Priority Data

Oct. 7, 2003 (TW) .................................. 92127856 A

(51) Int. Cl.[7] .............................................. H02G 3/00
(52) U.S. Cl. ................... 174/100; 174/135; 174/68.1; 174/68.3; 439/470
(58) Field of Search .............................. 174/100, 135, 174/68.1, 68.3; 439/470; 248/74.5, 74.1; 411/437, 999; 361/826

(56) References Cited

U.S. PATENT DOCUMENTS

| 4,770,378 A | * | 9/1988 | Onishi et al. ............... 248/68.1 |
| 5,411,228 A | * | 5/1995 | Morawa et al. ............ 248/74.5 |
| 5,902,961 A | * | 5/1999 | Viklund et al. ............. 174/100 |
| 6,613,981 B1 | * | 9/2003 | Hathcock et al. ............. 174/69 |

* cited by examiner

Primary Examiner—Dhiru R. Patel
(74) Attorney, Agent, or Firm—Troxell Law Office, PLLC

(57) ABSTRACT

A cable fixer for holding at least two cables, includes opposite top and bottom ends, an outer side wall that interconnects the top and bottom ends, an inner cable tunnel that passes through the top and bottom ends inwardly of the outer side wall and is capable of holding one of the cables, and an outer cable tunnel which is formed in the outer side wall from the top end to the bottom ends for holding the other one of the cables.

7 Claims, 5 Drawing Sheets

CABLE FIXER FOR AN ELECTRONIC DEVICE

FIELD OF THE INVENTION

The invention relates to a cable fixer, more particularly to a cable fixer for holding at least two cables of an electronic device.

BACKGROUND OF THE INVENTION

Due to rapid advance of modern electronic technology, more and more electronic devices, such as a central processing unit of a computer, require a large number of cables for connecting the same with the peripheral accessories, such as a printing machine and a digital copier. If the cables disposed around the electronic device are not arranged in an orderly way, accidentally collision to the cables by the user may occur, and subsequently decreases an aesthetic appearance of the device. Thus, a cable fixer is required to hold a cable on the electronic device.

Referring to FIGS. 1(A) and 1(B), a conventional cable fixer 2 is shown to be mounted in such a manner as to extend through a mounting hole 8 in an outer casing 6 of an electronic device (not shown), and includes left and right parts 202,204 that cooperatively define an annular recess 12 on outer surfaces thereof, an inner recess 16 and an inner protrusion 14 on inner surfaces thereof. The left and right parts 202,204 of the conventional cable fixer 2 are disposed at two opposite sides of the cable 4 and are then inserted forcibly into the mounting hole 8 such that the protrusion 14 of the right part 204 extends into the inner recess 16, and clamps the cable 4 against the right part 204.

Some disadvantages resulting from the use of the conventional cable fixer 2 are as follows:

(1) In case the electronic device has a plurality of cables 4, the outer casing 6 is required to form a plurality of mounting holes so that the cables can be mounted respectively by the use of a plurality of conventional cable fixers. The rigidity strength of the outer casing 6 is decreased.

(2). Waste of time and extra manufacture cost may occur.

(3) External electro-static discharge may hinder and disturb smooth functioning of inner components enclosed within the outer casing 6 via the mounting holes.

(4) Deformation of the cable 4 due to bending and twisting may decrease smooth signal transmission through the cables 4.

SUMMARY OF THE INVENTION

The object of the present invention is to provide a cable fixer that can hold at least two cables therein and that can eliminate the aforesaid disadvantages of the prior art cable fixer.

A cable fixer of the present invention is adapted to hold at least two cables of an electronic device that is formed with a vertical mounting hole. The cable fixer accordingly includes: a cable holding member adapted to be mounted on the electronic device in such a manner as to extend through the mounting hole, and including opposite top and bottom ends, an outer side wall that interconnects the top and bottom ends, an inner cable tunnel that passes through the top and bottom ends inwardly of the outer side wall, and an outer cable tunnel which is formed in the outer side wall from the top end to the bottom ends.

BRIEF DESCRIPTION OF THE DRAWING

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1A:
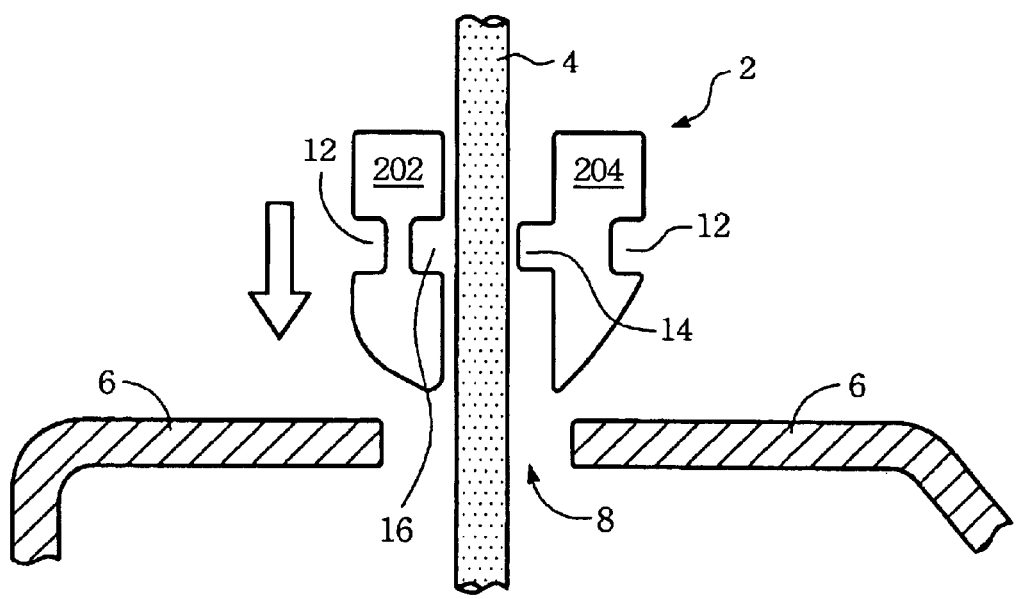
FIGS. 1(A) and 1(B) respectively show a sectional view, illustrating how a conventional cable fixer is inserted into an electronic device in order to mount a cable on the electronic device.
Figure 1B:
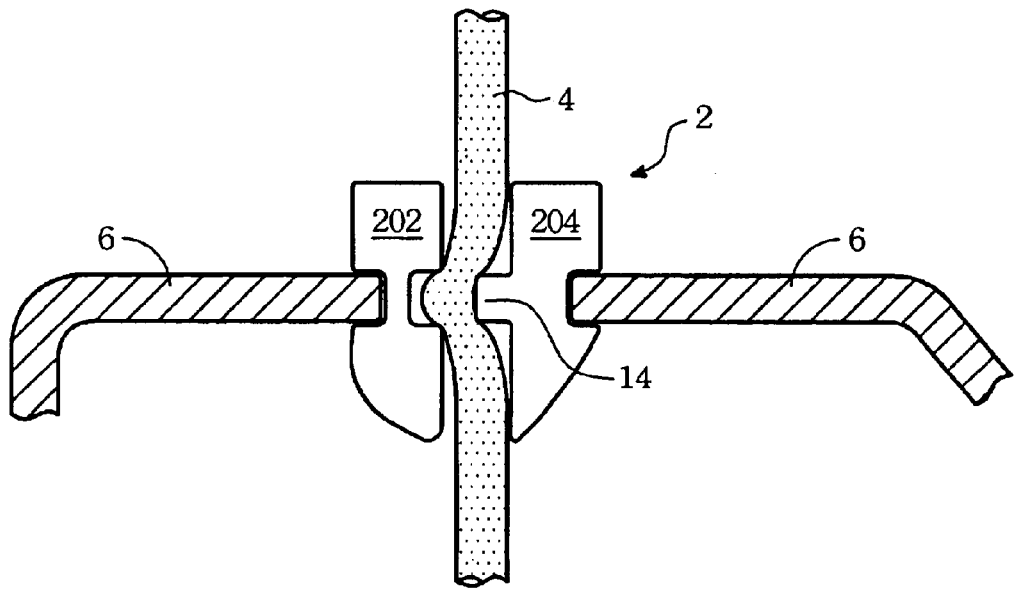
Figure 2:
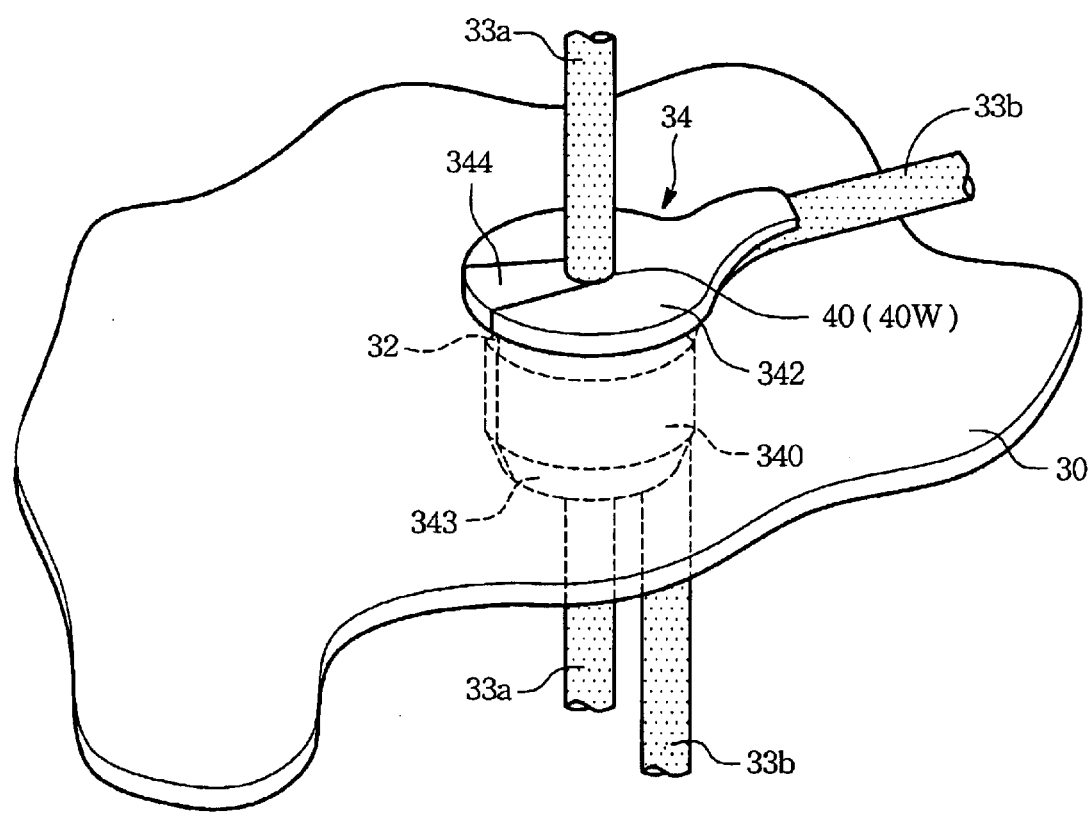
FIG. 2 is a schematic view of the preferred embodiment of a cable fixer according to the present invention when mounted on an electronic device.
Figure 3A:
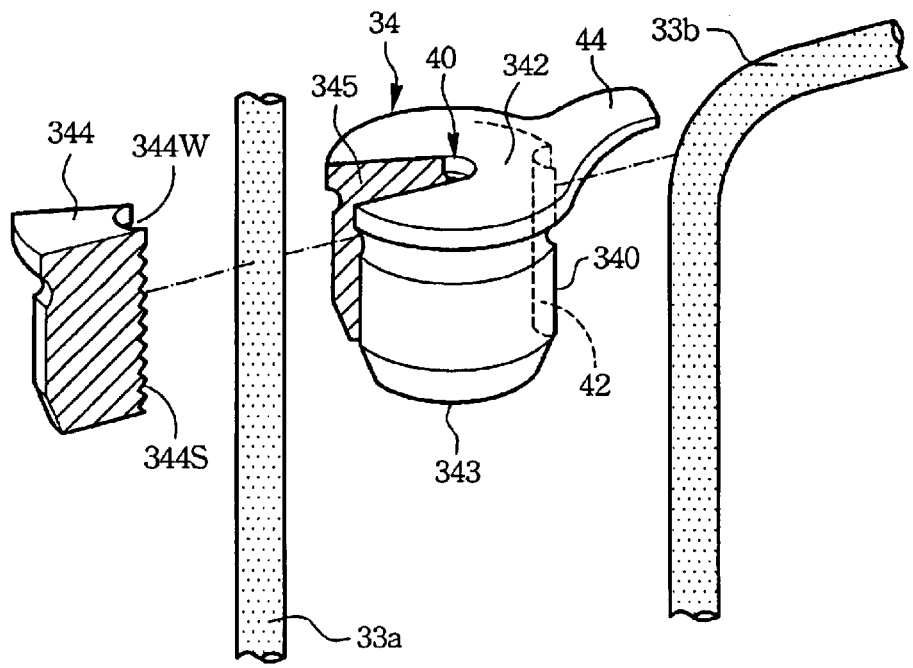
FIG. 3(A) is an exploded perspective view of the preferred embodiment shown together with two cables.
Figure 3B:
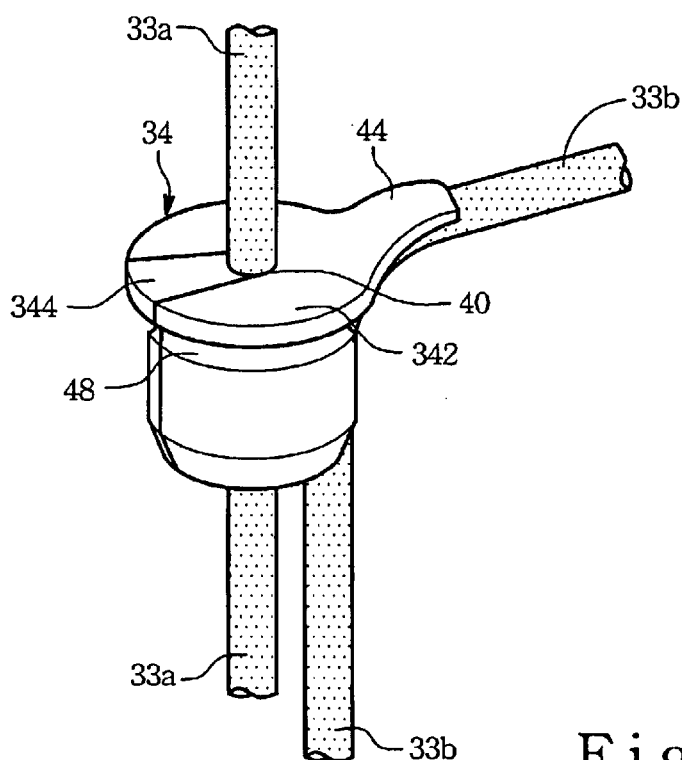
FIG. 3(B) is a perspective view, illustrating how the preferred embodiment holds two cables therein.

Referring to FIGS. 2, 3(A), and 3(B), the preferred embodiment of a cable fixer according to the present invention is provided to hold at least two cables (33a, 33b) of an electron device (not shown), and includes a cable holding 34, a sector-shaped insert piece 344, and a cable guiding member 44.

As illustrated, the holding member 34 is made from an elastic material, such as rubber, and is mounted on the electronic device in such a manner as to extend through a mounting hole 32 in an outer casing 30 of the electronic device. The holding member 34 has opposite top and bottom ends 342,343, an outer side wall 340 that interconnects the top and bottom ends 342,343, an inner cable tunnel 40 that passes through the top and bottom ends 342,343 inwardly of the outer side wall 340, and an outer cable tunnel 42 which is formed in the outer side wall 340 from the top end 342 to the bottom ends 343.

The cable holding member 34 further has a groove 345 that extends through the top and bottom ends 342,343 and that is in spatial communication with the inner cable tunnel 40. The groove 345 has a sector-shape in cross-section.

The insert piece 344 is also made from rubber and can be disposed fittingly within the groove 345 in the cable holding member 34.

In this embodiment, the cable holding member 34 is generally cylindrical-shaped, defines an axis and has an inner side wall 40W that interconnects the top and bottom ends 342,343 thereof. The insert piece 344 has an inner side wall 344W facing and cooperating with the inner side wall 40W of the cable holding member 34 to define the inner cable tunnel 40. In addition, the inner side walls 40W,344W of the cable holding member 34 and the insert piece 344 respectively have lower serrated portions 344S,40S. The insert piece 344 has an outer side wall that cooperates with the outer side wall 340 of the cable holding member 34 to define an annular recess 48.

The guiding member 44 extends outwardly and laterally from the top end 342 of the cable holding member 34 in a transverse direction relative to the axis of the cable holding member 34.

Figure 4:
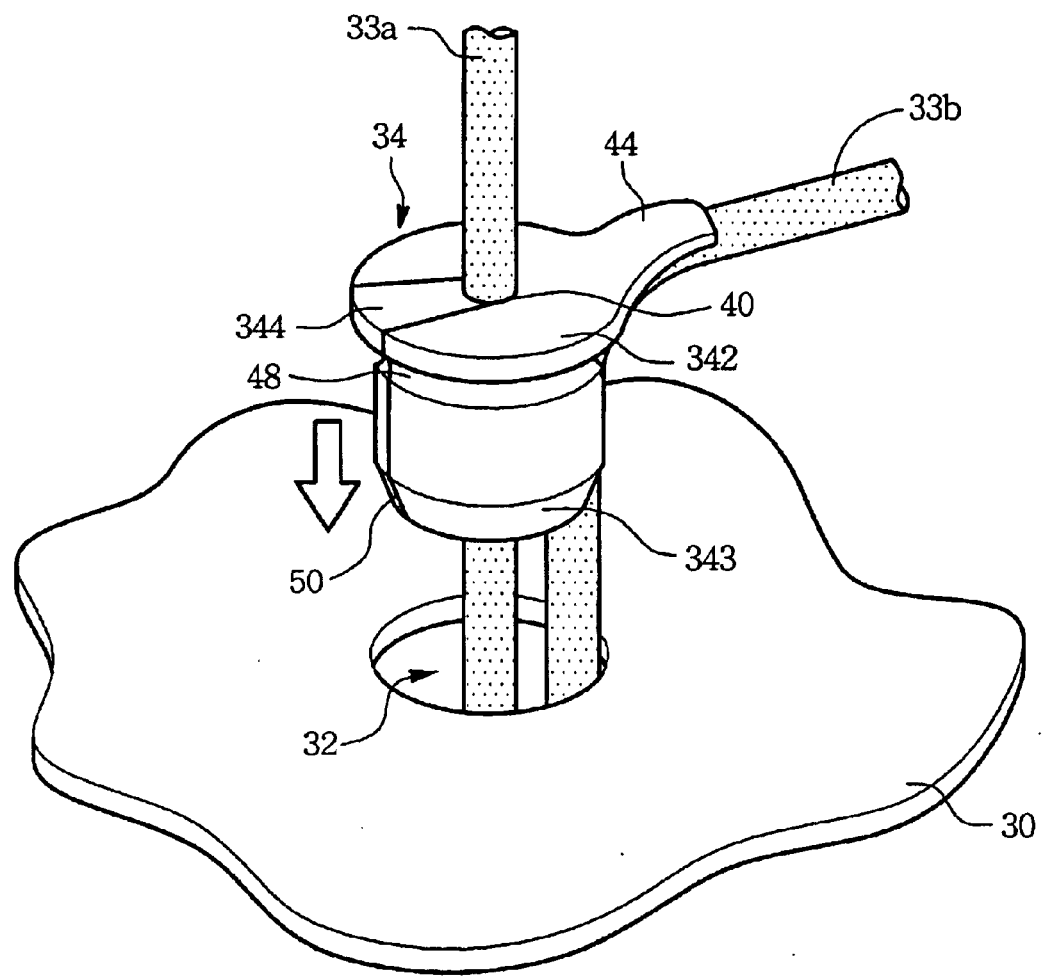
FIG. 4 is a perspective view, illustrating how the preferred embodiment is inserted into a mounting hole of an electronic device.

Referring to FIGS. 3(A),3(B) and 4, the cables (33a,33b) of the electronic device can be firmly retained on the outer casing 30 of the device by using the preferred embodiment of the present invention in the following manner. Firstly, the cable (33a) is inserted through the inner cable tunnel 40 in the cable holding member 34 via the groove 345. Secondly, the insert piece 344 is disposed fittingly within the groove 345 in the cable holding member 34, and clamps the cable (33a) against the cable holding member 34. Thirdly, the cable (33b) is disposed within the outer cable tunnel 42 in the cable holding member 34 in such a manner that a portion of the cable (33b) is depressed by the guiding member 44 so as to form an L-shaped. Finally, the assembly of the cable holding member 34 and the insert piece 344 is press-fitted resiliently through the mounting hole 32 in the outer casing 30, as best shown in FIG. 4.

Figure 5:
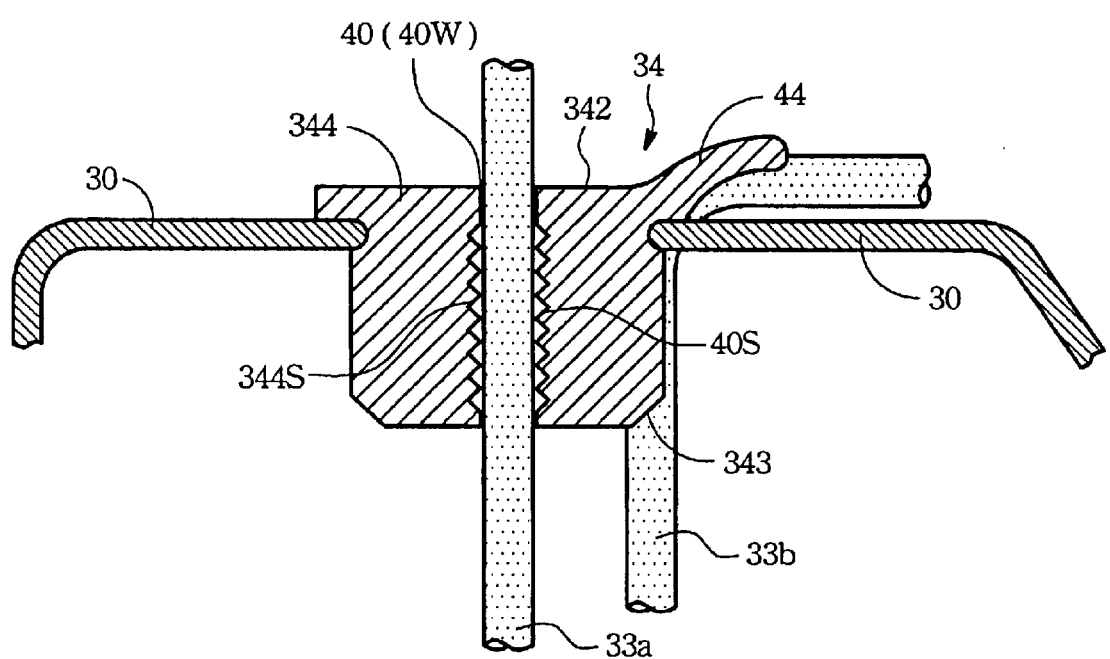
FIG. 5 is a sectional view of the preferred embodiment when mounted in the mounting hole of the electronic device.

Preferably, lower ends 50,343 of the cable holding member 34 and the insert piece 344 are conical-shaped to facilitate insertion of the same into the mounting hole 32. Under this condition, the inner peripheral portion of the outer casing 30 defining the mounting hole 32 extend into and engages frictionally the annular recess 48 in the cable holding member 34 and the insert piece 344, thereby preventing untimely removal of the preferred embodiment of the present invention from the outer casing 30. The cable (33a) is firmly retained in the inner cable tunnel 40 by virtue of the serrated portions 344S,40S of the insert piece 344 and the cable holding member 34 (see FIG. 5), and can withstand an outwardly pull away from the outer casing 30. The L-shaped portion of the cable (33b) is disposed parallel to and closely with an upper portion of the outer casing 30 so as to minimize the storing space for the outer casing 30. The preferred embodiment can be constructed to have more than one outer cable tunnel 42 in the outer side wall 310 (see FIG. 2) in order to retain more than one cable at the outer side wall 340 of the electronic device in a neat-and-tidy manner.

The cable (33a) can be a power transmission cable and is adapted to be connected electrically to a power source for supply of current to the electronic device. The cable (33b) can be a signal transmission cable and is adapted to be connected to a peripheral accessory of the electronic device, like a printing machine. Since the relevant feature of this invention does not reside in the construction of the cables, a detailed description thereof is omitted herein for the sake of brevity.

The advantages provided by the cable fixer of the present invention are as follows:

(1) Forming of a plurality of cable mounting holes in the outer casing of an electronic device is eliminated. Thus, external electro-static discharges can not hinder smooth functioning of the electronic components disposed within the outer casing 30.

(2) The cables (33a,33b) of the electronic device can be kept in a neat-and-tidy manner, thereby enhancing an aesthetic appearance of the electronic device.

(3) Deformation of the cables (33a,33b) due to bending and folding of the cables will not occur when the cable fixer of the present invention is used.

(4) The occupying space of the electric device is according minimized.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A cable fixer for holding at least two cables of an electronic device that is formed with a vertical mounting hole, said cable fixer comprising:

a cable holding member adapted to be mounted on the electronic device in such a manner as to extend through the mounting hole, said cable holding member having opposite top and bottom ends;

an outer side wall that interconnects said top and bottom ends;

an inner cable tunnel that passes through said top and bottom ends inwardly of said outer side wall and that is adapted receive one of the two cables therethrough, and an outer cable tunnel that is formed in said outer side wall from said top end to said bottom ends, wherein said cable holding member further includes a groove that extends through said top and bottom ends and that is in spatial communication with said inner cable tunnel, said groove having a sector-shape in cross-section.

2. The cable fixer as defined in claim 1, further comprising an insert piece that is disposed fittingly in said groove and is adapted to press one of the two cables against said cable holding member.

3. The cable fixer as defined in claim 2, wherein said cable holding member is generally cylindrical-shaped, defining an axis and having an inner side wall that interconnects said top and bottom ends thereof, said insert piece having an inner side wall facing and cooperating with said inner side wall of said cable holding member to define said inner cable tunnel.

4. The cable fixer as defined in claim 3, wherein said inner side walls of said cable holding member and said insert piece respectively have lower portions which are serrated so as to provide enhance clamping of a first cable of the two cables.

5. The cable fixer as defined in claim 4, further comprising a cable guiding member that extends outwardly and laterally from said top end of said cable holding member in a transverse direction relative to the axis of said cable holding member and that is adapted to guide a portion of a second cable of the two cables disposed in said outer cable tunnel such that the portion of the second cable of the two cables is disposed closely with the electronic device.

6. The cable fixer as defined in claim 5, wherein said insert piece has an outer side wall that cooperates with said outer side wall of said cable holding member so as to define an annular recess.

7. The cable fixer as defined in claim 6, wherein said cable holding member and said insert piece are made from an elastic material.

* * * * *